United States Patent
Lin et al.

(10) Patent No.: US 10,015,493 B2
(45) Date of Patent: Jul. 3, 2018

(54) ENCODING METHOD AND APPARATUS AND DECODING METHOD AND APPARATUS FOR VIDEO SYSTEM THAT SELECTIVELY PERFORMS SECONDARY TRANSFORM

(71) Applicant: MStar Semiconductor, Inc., Hsinchu Hsien (TW)

(72) Inventors: He-Yuan Lin, Zhubei (TW); Yi-Shin Tung, Zhubei (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 262 days.

(21) Appl. No.: 14/731,574

(22) Filed: Jun. 5, 2015

(65) Prior Publication Data

US 2016/0014414 A1 Jan. 14, 2016

(30) Foreign Application Priority Data

Jul. 11, 2014 (TW) .............................. 103123914 A

(51) Int. Cl.
| | |
|---|---|
| *H04N 19/12* | (2014.01) |
| *H04N 19/147* | (2014.01) |
| *H04N 19/593* | (2014.01) |
| *H04N 19/176* | (2014.01) |
| *H04N 19/61* | (2014.01) |
| *H04N 19/625* | (2014.01) |
| *H04N 19/127* | (2014.01) |
| *H04N 19/157* | (2014.01) |

(52) U.S. Cl.
CPC ........... *H04N 19/12* (2014.11); *H04N 19/127* (2014.11); *H04N 19/157* (2014.11); *H04N 19/176* (2014.11)

(58) Field of Classification Search
CPC .... H04N 19/12; H04N 19/127; H04N 19/157; H04N 19/176
USPC ..................................................... 375/240.02
See application file for complete search history.

(56) References Cited

U.S. PATENT DOCUMENTS

| | | | |
|---|---|---|---|
| 2012/0127003 A1* | 5/2012 | Shibahara | H04N 19/122 341/87 |
| 2013/0003856 A1* | 1/2013 | Saxena | H04N 19/159 375/240.18 |
| 2014/0254675 A1* | 9/2014 | Lee | H04N 19/12 375/240.12 |

FOREIGN PATENT DOCUMENTS

| | | |
|---|---|---|
| TW | 201136325 A1 | 10/2011 |
| TW | 201143465 A1 | 12/2011 |

* cited by examiner

*Primary Examiner* — Francis G Geroleo
(74) *Attorney, Agent, or Firm* — Edell, Shapiro & Finnan, LLC

(57) ABSTRACT

An encoding apparatus includes an intra-prediction module, a transform module and a control module. The intra-prediction module performs intra-prediction on an image block in a video frame according to a plurality of sets of reference image data to generate a residual block. The reference image data includes a set of reference image data corresponding to a predetermined side of the image block. The transform module performs preliminary transform on the residual block to generate a preliminary transform coefficient matrix. According to whether at least one of the reference image data corresponding to the predetermined side is generated according to image data of an adjacent pixel of the image block, the control module determines whether secondary transform perpendicular to the predetermined side is to be performed on a low-frequency component sub-matrix in the preliminary transform coefficient matrix.

19 Claims, 9 Drawing Sheets

ENCODING METHOD AND APPARATUS AND DECODING METHOD AND APPARATUS FOR VIDEO SYSTEM THAT SELECTIVELY PERFORMS SECONDARY TRANSFORM

This application claims the benefit of Taiwan application Serial No. 103123914, filed Jul. 11, 2014, the subject matter of which is incorporated herein by reference.

BACKGROUND OF THE INVENTION

Field of the Invention

The invention relates in general to multimedia signal processing technologies, and more particularly to encoding/decoding technologies in a video system.

Description of the Related Art

Digital television broadcasting has matured and become popular with the ever-improving communication technologies. In addition to being transmitted through cables, digital television signals may be propagated in form of wireless signals via base stations or artificial satellites. To satisfy demands on enhanced image quality and reduced transmission data amount, a transmitter end usually encodes and decompresses audio/video signals to be transmitted. Correspondingly, a receiver end needs to correctly decode and decompress the received signals in order to restore the audio/video signals.

FIG. 1 shows a partial functional block diagram of an encoding system compliant to the digital audio video coding standard (AVS). An intra-prediction module 12 performs an intra-prediction process on image blocks in a video frame to generate luminance residual blocks corresponding to the image blocks. For example, FIG. 2(A) to FIG. 2(D) depict several different reference modes considered when the intra-prediction module 12 performs intra-prediction. An image block 20 includes 8*8 pixels. In the reference mode in FIG. 2(A), the intra-prediction module 12 regards luminance values of eight reference points (the shaded points) at the top of the image block 20 as reference values to calculate luminance residual values of the pixels in the image block 20. As shown by the arrow pointing vertically downward in FIG. 2(A), the pixels in each column correspond to the reference point right above, and the luminance residual value of each pixel is a difference between its luminance value and the luminance value of the corresponding reference point. Thus, the size of the luminance residual block is same as that of the image block 20, i.e., including 8*8 luminance residual values.

Different reference modes adopt different reference points. In the reference mode in FIG. 2(B), the intra-prediction module 12 regards luminance values of eight reference points at the left of the image block 20 as reference values. In the reference mode in FIG. 2(C), the intra-prediction module 12 regards luminance values of 15 reference points at the upper right of the image block 20 as reference values. In the reference mode in FIG. 2(D), the intra-prediction module 12 regards luminance values of 15 reference points at the top and left of the image block 20 as reference values. Details of intra-prediction and other reference modes may be referred from technical documents provided by the AVS work team. In general, contents of luminance residual blocks obtained from different reference modes are different. The intra-prediction module 12 estimates data amounts and distortion rates of converted and quantized luminance residual blocks corresponding to the reference modes, selects a luminance residual block that most satisfies two conditions including a small data amount and a low distortion rate therefrom, and regards the selected the luminance residual block as the luminance residual block representing the image block 20.

The luminance residual block selected by the intra-prediction module 12 is provided to a discrete cosine transform (DCT) module 14 for a DCT process to generate a DCT coefficient matrix. In this example, the size of the DCT coefficient matrix, same as that of the luminance residual block, includes 8*8 DCT coefficients. To further reduce the data amount, a secondary transform module 16 performs a secondary transform process on low-frequency components in the DCT coefficient matrix. According to the AVS specification, regardless of the size (N*N) of the DCT coefficient matrix, the secondary transform module 16 performs the secondary process on only 4*4 low-frequency components at the upper left (as shown in FIG. 3). Similar to the DCT process, the secondary transform process actually sequentially includes secondary transform performed along a vertical direction and secondary transform performed along a horizontal direction. The low-frequency components having undergone the secondary transform and other high-frequency DCT coefficients that have not been processed by the secondary transform are recombined at a quantization module 18, which then performs a quantization process on the DCT coefficients.

Known to one person skilled in the art, spatial correlation is usually present among adjacent pixels of a same image. That is to say, image data of two adjacent pixels does not differ drastically under most circumstances. The foundation of the secondary transform performed after the DCT process is based on the assumption of the presence of spatial correlation. More specifically, when spatial correlation is present between the image block and the reference points at the top of the image block, performing secondary transform along the vertical direction on the low-frequency components in the DCT coefficient matrix reduces the data amount. Similarly, when spatial correlation is present between the image block and the reference points at the left of the image block, performing secondary transform along the horizontal direction on the low-frequency components in the DCT coefficient matrix also reduces the data amount. However, one issue of current solutions is that, whether spatial correlation is present between an image block and its reference points when the secondary transform module 16 performs secondary transform is not considered. Thus, the secondary transform performed by the secondary transform module 16 is sometimes unnecessary, and may even yield an undesired effect of an increased data amount after the transform process.

SUMMARY OF THE INVENTION

The invention is directed to an encoding apparatus and method, and a decoding apparatus and method. By considering whether there is spatial correlation between a pixel in an image block and a reference point, the apparatus and method of the present invention are capable of preventing unnecessary secondary transform.

A video encoding apparatus applied to a video system is provided according to an embodiment of the present invention. The encoding apparatus includes an intra-prediction module, a transform module and a control module. The intra-prediction module performs an intra-prediction process on an image block in a video frame according to a plurality of sets of reference image data to generate a residual block. The plurality of sets of reference image data includes a set of reference image data corresponding to a predetermined side of the image block. The transform module performs a preliminary transform process on the residual block to generate a preliminary transform coefficient matrix. According to whether at least one of the set of reference image data at the predetermined side is generated according to image data of at least one adjacent pixel of the image block, the control module determines whether to perform a secondary transform process perpendicular to the predetermined side on a low-frequency component sub-matrix in the preliminary transform coefficient matrix. The transform module selectively performs the secondary transform process on the low-frequency component sub-matrix according to the determination result of the control module.

A video encoding method applied to a video system is provided according to an embodiment of the present invention. An intra-prediction process is performed on an image block in a video frame according to a plurality of sets of reference data to generate a residual block. The plurality of sets of reference data includes a set of first reference image data corresponding to a predetermined side of the image block. A preliminary transform process is performed on the residual block to generate a preliminary transform coefficient matrix. According to whether at least one of the set of the first reference data corresponding to the predetermined side is generated according to image data of at least one adjacent pixel of the image block, it is determined whether secondary transform perpendicular to the predetermined side is to be performed on a low-frequency component sub-matrix in the preliminary transform coefficient matrix.

A video decoding apparatus applied to a video system is provided according to an embodiment of the present invention. The decoding system includes a control module, an inverse transform module and a reconstruction module. According to whether at least one of a set of reference image data is generated according to image data of at least one adjacent pixel of an image block, the control module determines whether an inverse secondary transform process is to be performed on a low-frequency component signal of the image block. The set of reference image data corresponds to a predetermined side of the image block, and a direction of the inverse secondary transform is perpendicular to the predetermined side. The transform module selectively performs an inverse secondary transform process on the low-frequency component signal according to the determination result of the control module to generate a low-frequency component sub-matrix, and performs an inverse preliminary transform process on a preliminary transform coefficient matrix including the low-frequency component sub-matrix to generate a residual block. The reconstruction module reconstructs the image block according to the residual block and a plurality of sets of reference image data.

A video decoding method applied to a video system is provided according to an embodiment of the present invention. The decoding method includes following steps. According to whether at least one of a set of reference image data is generated according to image data of at least one adjacent pixel of an image block, it is determined whether inverse secondary transform is to be performed on a low-component signal of the image block. The reference image data corresponds to a predetermined side of the image block, and a direction of the inverse secondary transform is perpendicular to the predetermined side. An inverse secondary transform process is selectively performed on the low-frequency component signal according to the determination result to generate a low-frequency component sub-matrix. An inverse preliminary transform process is performed on a preliminary transform coefficient matrix including the low-frequency component sub-matrix to generate a residual block. The image block is then reconstructed according to the residual block and a plurality of sets of reference image data.

The above and other aspects of the invention will become better understood with regard to the following detailed description of the preferred but non-limiting embodiments. The following description is made with reference to the accompanying drawings.

It should be noted that, the drawings of the present invention include functional block diagrams of multiple functional modules related to one another. These drawings are not detailed circuit diagrams, and connection lines therein are for indicating signal flows only. The interactions between the functional elements/or processes need not be achieved through direct electrical connections. Further, functions of the individual elements are not necessarily distributed as depicted, and separate blocks are not necessarily implemented by separate electronic elements.

DETAILED DESCRIPTION OF THE INVENTION

Figure 1:
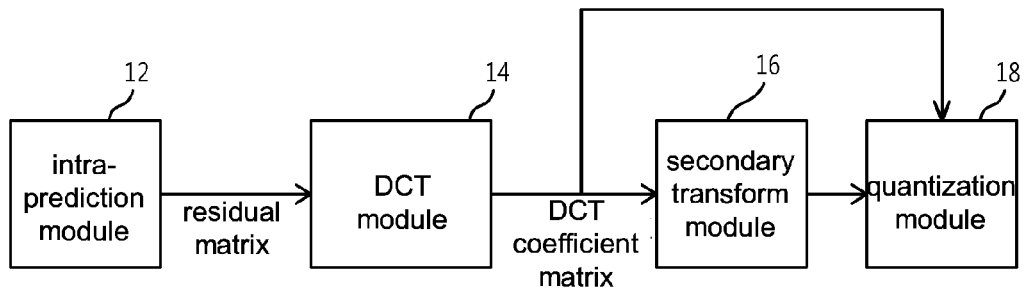
FIG. 1 is a partial functional block diagram of an encoding system compliant to the digital AVS.
Figure 2A:
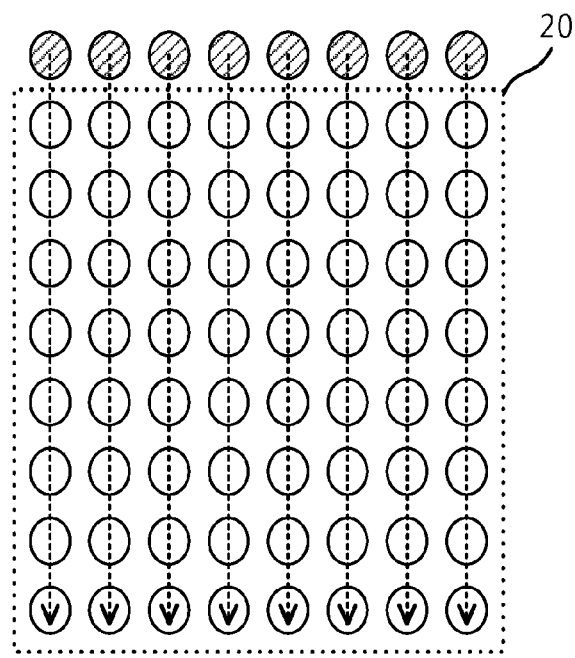
FIG. 2(A) to FIG. 2(D) are several reference modes considered when performing intra-prediction.
Figure 2B:
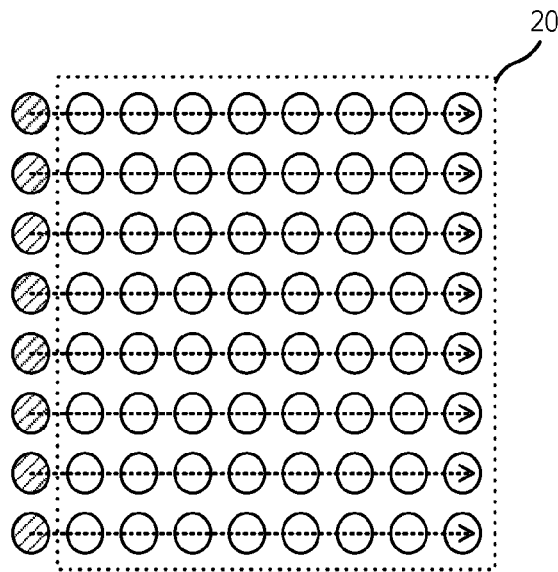
Figure 2C:
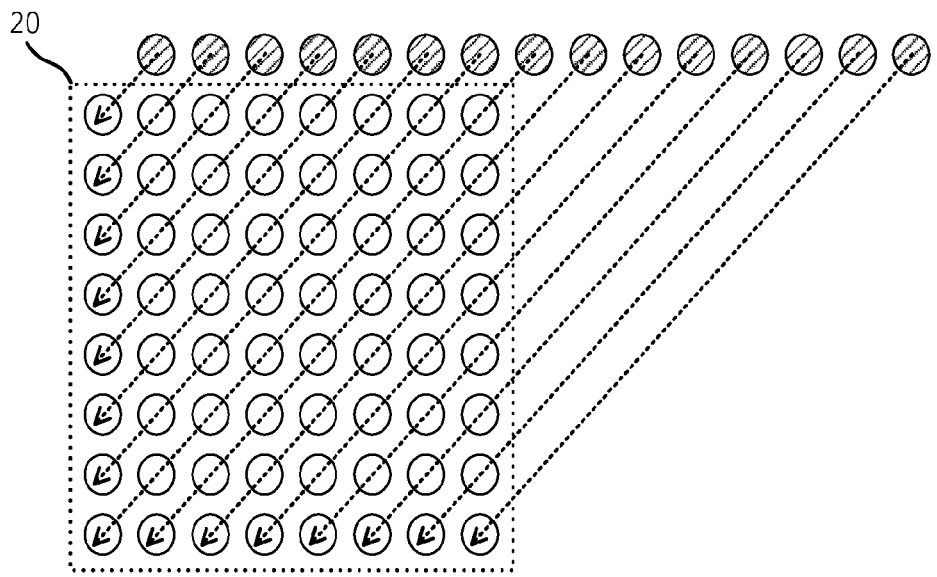
Figure 2D:
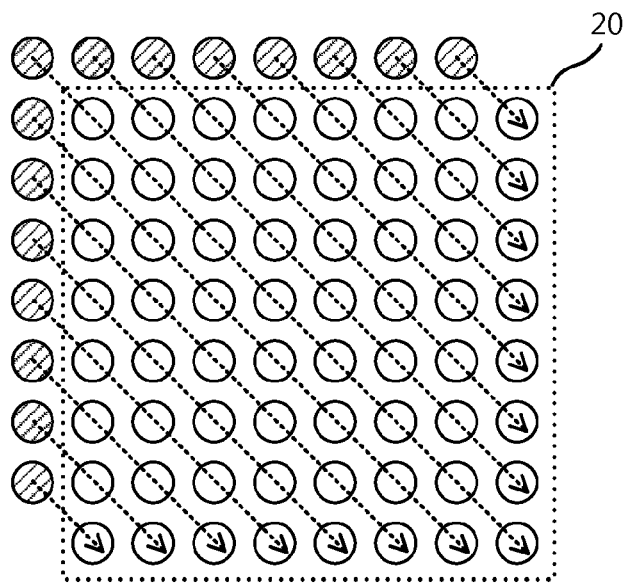
Figure 3:
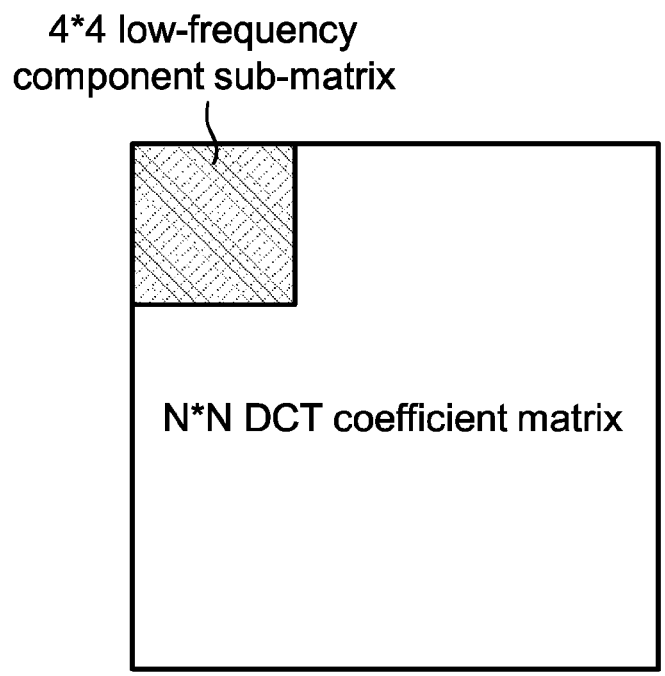
FIG. 3 shows correspondence between an N*N DCT coefficient matrix and its low-frequency component sub-matrix.
Figure 4A:
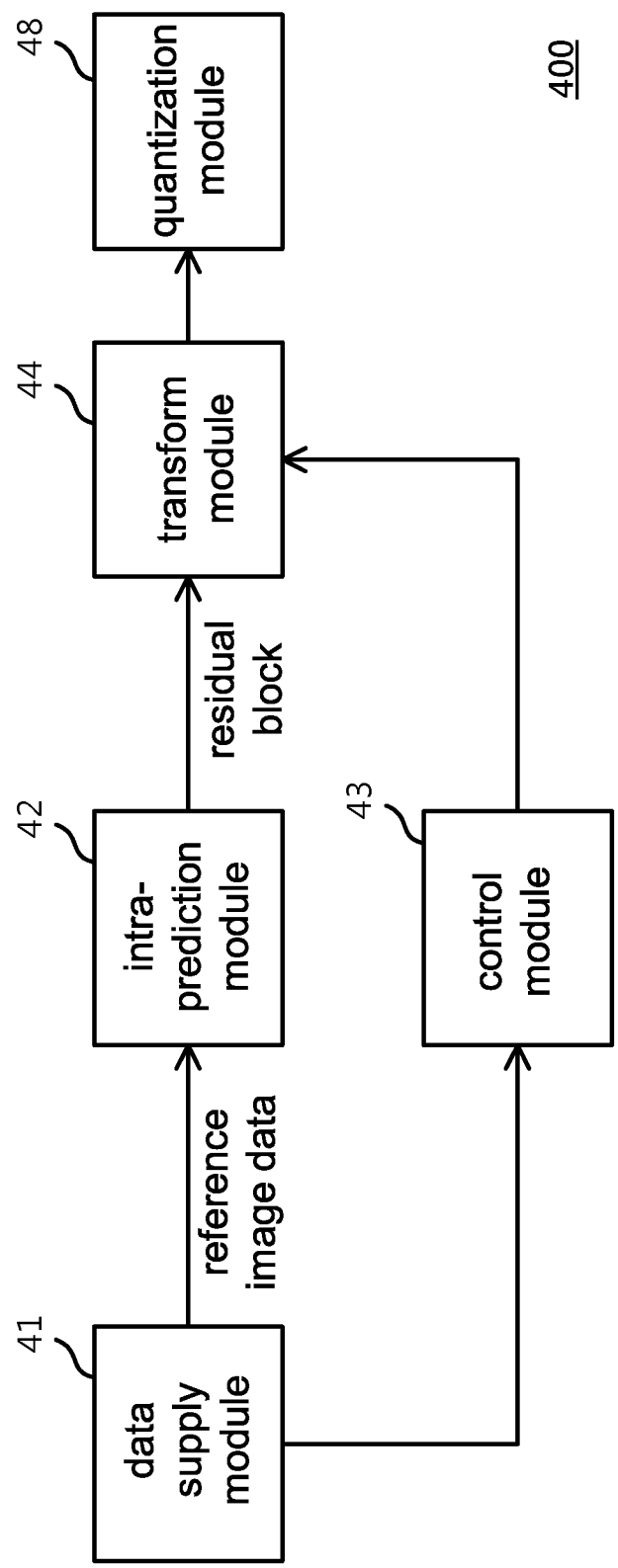
FIG. 4(A) and FIG. 4(B) are functional block diagrams of an encoding apparatus according to an embodiment of the present invention.

FIG. 4(A) shows a functional block diagram of a video encoding apparatus applied to a video system according to an embodiment of the present invention. A video encoding apparatus 400 includes a data supply module 41, an intra-prediction module 42, a control module 43, a transform module 44 and a quantization module 48. In practice, the video encoding apparatus 400 may be integrated in various video systems (e.g., an AVS encoding system) adopting such type of circuit architecture, or may be an independent unit.

The intra-prediction module 42 performs an intra-prediction process on an image block in a video frame according to a plurality of sets of reference data provided by the data supply module 41 to generate a residual block. The plurality of sets of reference data include image data at reference points that all reference modes consider for intra-prediction. For example, the plurality of sets of reference data may be image data corresponding to multiple reference points at the top and left of the image block (which are outside the image block). For example, the plurality of sets of reference image data may be luminance values and chrominance values at multiple reference points, and the residual block is a luminance residual block or a chrominance residual block. It should be noted that the present invention is not limited to the above examples. The transform module 44 first performs a preliminary transform process on the residual block to generate a preliminary transform coefficient matrix. For example, the preliminary transform process may be discrete cosine transform (DCT) or integer transformed modified from DCT. In the description below, the preliminary transform process is exemplified by a DCT process and the preliminary transform coefficient matrix is exemplified by a DCT matrix. The transform module 44 is controlled by the control module 43 to selectively perform a secondary transform process on a low-frequency component sub-matrix in the DCT matrix. The quantization module 48 performs a quantization process on an output signal from the transform module 44.

Figure 4B:
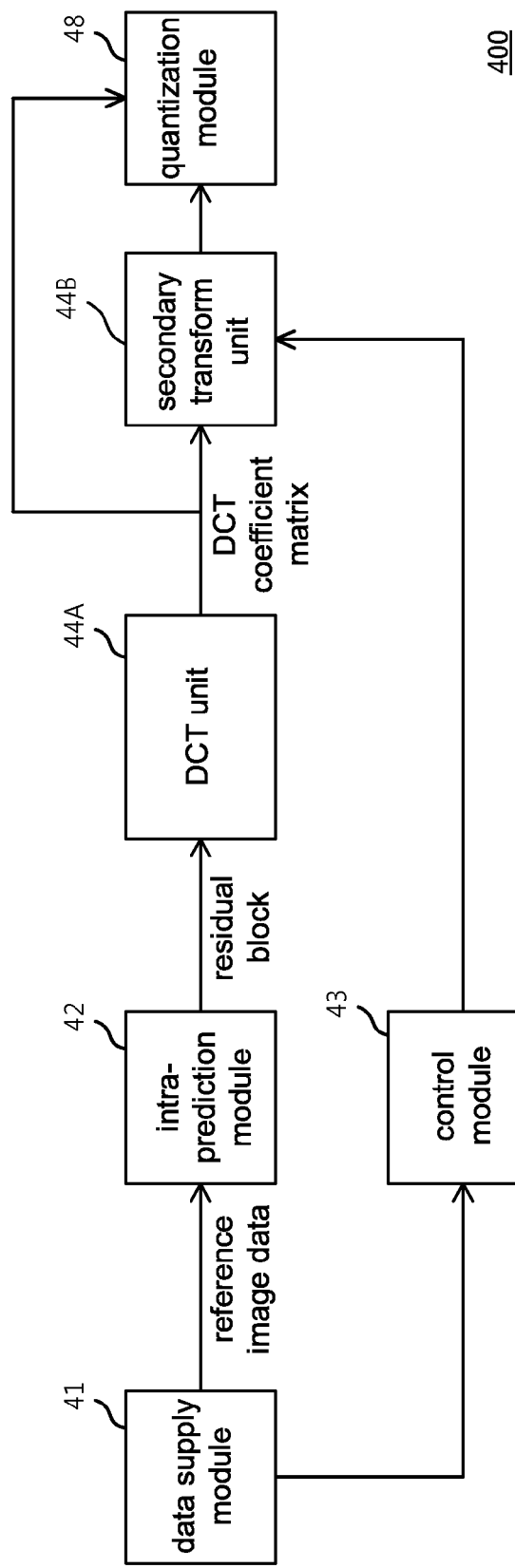

FIG. 4(B) shows a detailed embodiment of the transform module 44. In this embodiment, the transform module 44 includes a DCT unit 44A and a secondary transform unit 44B configured to perform DCT and secondary transform, respectively. One person skilled in the art can understand that, the DCT unit 44A and the secondary transform unit 44B may also be implemented by one single multiplication circuit that performs the DCT and secondary transform in a time division manner.

Several examples of determination logics according to which the control module 43 determines whether to perform a secondary transform process on the low-frequency component sub-matrix in the DCT matrix are given below.

Figure 5:
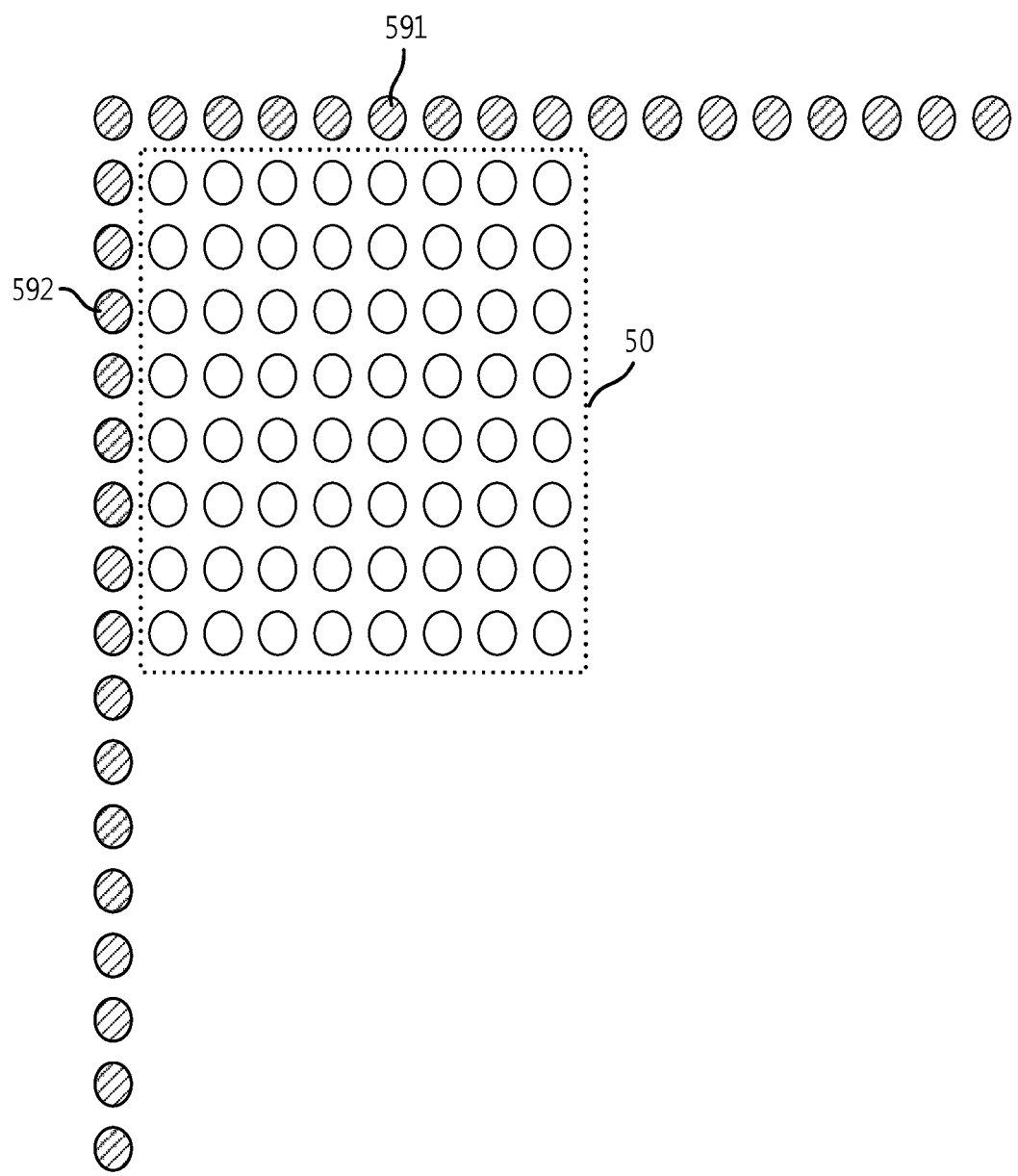
FIG. 5 shows correspondence between an image block and its multiple reference points.

FIG. 5 shows an embodiment of correspondence between an image block 50 and a plurality of reference points (shaded points). In this example, different reference modes respectively correspond to image data of all or a part of the reference points. It should be noted that, data of the reference points may not be pixels directly adjacent to edges of the image block 50. At one reference point, the corresponding reference image data, e.g., a luminance value, may be a weighted average value that the data supply module 41 calculates from luminance values of several actual pixels near the reference point, or predetermined filler data irrelevant to actual pixel data. For example, when the image block is an image block at an uppermost row of the video frame, no adjacent actual pixels further up are available for generating the reference image data. For another example, when the image block 50 is an image block at a leftmost of the video frame, no adjacent actual pixels further left are available for generating the reference image data. In the above special situations, the data supply module 41 fills predetermined data as the luminance values corresponding to the reference points. Predetermined filler data is usually used when an image block to be processed is located at an edge of a video frame or an image slice. Even in the same video frame, pixels among different image slices may not mutually serve as reference points. In practice, a video specification having a grayscale range between 0 and 255 may adopt the median value 128 as the predetermined filler data. It is understood from the above details that there is no spatial correlation between a reference point with predetermined filler data and pixel data in the image block 50.

Rules according to which image specifications select predetermined filler data are different. However, in these circumstances, through the information provided by the data supply module 41, the control module 43 can learn which of the plurality of sets is associated or unassociated with the actual adjacent pixels of the image block 50, i.e., which is actual image data generated according to image data of the actual adjacent pixels and which is the predetermined filler data.

In one embodiment, regardless of the reference mode that the residual block uses, when the reference image data corresponding to an upper edge of the image block 50 includes actual image data, the control module 43 determines that secondary transform along the vertical direction is to be performed on the low-frequency component sub-matrix in the DCT coefficient matrix. When the reference image data at the left of the image block 50 includes the actual image data, the control module 43 determines that secondary transform along the horizontal direction is to be performed on the low-frequency component sub-matrix in the DCT coefficient matrix. When the encoding apparatus 400 is applied in coordination with an AVS video system, the image data of the reference points at the top of the image block 50 (outside of the image block) is all actual image data or is all predetermined filler data, and the image data at the left (outside of the image block) is also all actual image data or is all predetermined filler data. Thus, by determining that any reference image data (e.g., image data of a reference point 591) corresponding to an upper edge of the image block 50 is actual image data or predetermined filler data, the control module 43 may determine whether to cause the transform module 44 to perform secondary transform along the vertical direction on the low-frequency component sub-matrix in the DCT coefficient matrix. Similarly, by determining that any reference image data (e.g., image data of a reference point 592) corresponding to a left edge of the image block 50 is actual image data or predetermined filler data, the control module 43 may determine whether to cause the transform module 44 to perform secondary transform along the horizontal direction on the low-frequency component sub-matrix in the DCT coefficient matrix. When the image data of both the reference points 591 and 592 is predetermined filler data, the control module 43 controls the transform module 44 not to perform any secondary transform on the low-frequency component sub-matrix in the DCT coefficient matrix.

In conclusion, the transform module 44 does not perform secondary transform in a direction perpendicular to the side when spatial correlation is not present between a reference point at a side of an image block and a pixel in the image block. Thus, the encoding apparatus 400 avoids unnecessary secondary transform processes. It should be noted that, the control module 43 may also be designed to determine whether the corresponding secondary transform is to be performed based on only one reference point at a specific side. More specifically, the control module 43 may be designed to determine whether secondary transform along the vertical direction is to be omitted, or be designed to determine whether secondary transform along the horizontal direction is to be omitted.

In another embodiment, in addition to considering whether the reference image data is actual image data or predetermined filler data, the control module 43 also takes into account the reference mode applied corresponding to a final residual block outputted from the intra-prediction module 42. More specifically, when the reference mode corresponding to the final residual block outputted from the intra-prediction module 42 involves the reference point at an upper edge of the image block 50, i.e., when the final residual block outputted from the intra-prediction module 42 is directly associated with the reference image data corresponding to an upper edge of the image block, the control module 42 further checks whether the reference image data corresponding to the upper edge of the image block 50 is actual image data. Only when the final residual block outputted from the intra-prediction module 42 is directly associated with the reference image data corresponding to the upper edge of the image block 50, as well as the reference image data corresponding to the upper edge of the image block 50 is actual image data, the control module 43 then causes the transform module 44 to perform secondary transform along the vertical direction on the low-frequency component sub-matrix in the DCT coefficient matrix. Conversely, when one of the two criteria is not met, i.e., when the residual block is not directly associated with the reference image data corresponding to the upper edge of the image block 50, or the reference image data at the upper edge of the image block 50 is predetermined filler data, the control module 43 determines that the transform module 44 is not to perform secondary transform along the vertical direction on the low-frequency component sub-matrix in the DCT coefficient matrix of the image block 50.

On the other hand, when the reference mode corresponding to the final residual block outputted from the intra-prediction module 42 involves the reference point at the left of the image block i.e., when the final residual block outputted form the intra-prediction module 42 is directly associated with the reference image data corresponding to the left of the image block 50, the control module 43 further considers whether the reference image data corresponding to the left of the image block 50 is actual image data. Only when the final residual block outputted from the intra-prediction module 42 is directly associated with the reference image data corresponding to the left of the image block 50, and the reference image data corresponding to the left of the image block 50 is actual image data, the control module 43 then causes the transform module 44 to perform secondary transform along the horizontal direction on the low-frequency component sub-matrix in the DCT coefficient matrix. Conversely, when one of the two criteria is not met, i.e., when the residual block is not directly associated with the reference image data corresponding to the left of the image block 50, or the reference image data at the left of the image block 50 is predetermined filler data, the control module 43 determines that the transform module 44 is not to perform secondary transform along the horizontal direction on the low-frequency component sub-matrix in the DCT coefficient matrix of the image block 50.

In practice, the control module 43 may be realized by various control and processing platforms, including fixed and programmable logic circuits, e.g., programmable logic gate arrays, application-specific integrated circuits, microcontrollers, microprocessors, and digital signal processors. Further, the control module 43 may also be designed to complete multiple tasks through executing a processor instruction stored in a memory (not shown). The present invention does not limit the encoding apparatus 400 to be implemented by certain configurations or architecture. One person skilled in the art can understand that, there are various circuit configurations and elements for implementing the concept of the present invention without departing from the spirit of the present invention.

It should be noted that, details of the intra-prediction, DCT, secondary transform and quantization processes are generally known to one person skilled in the art, and shall be omitted herein.

Figure 6:
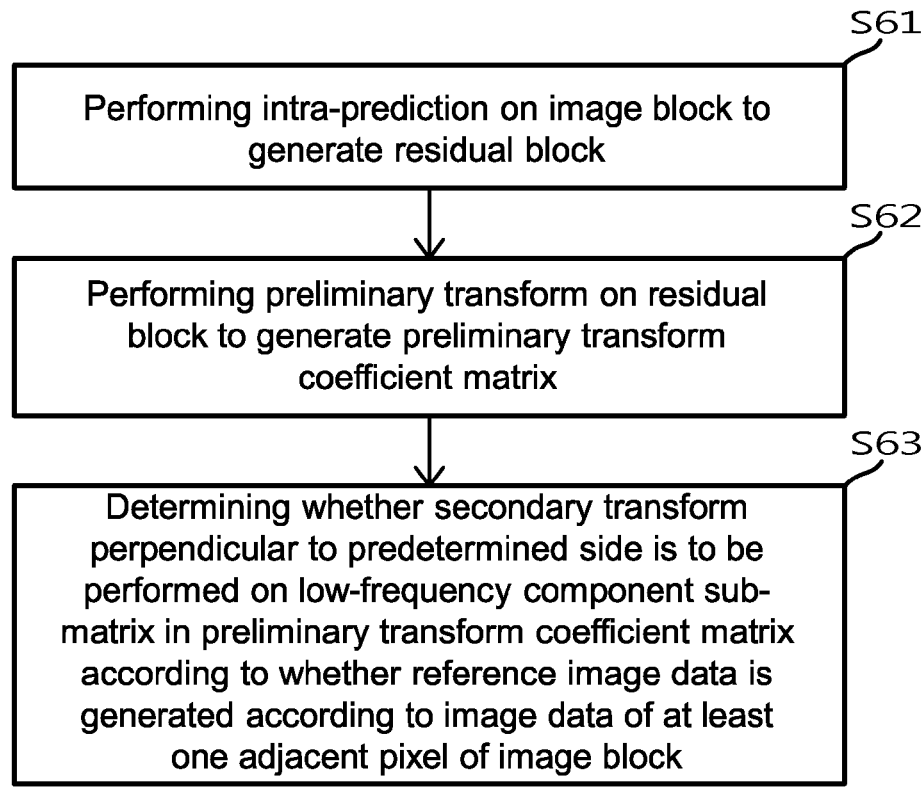
FIG. 6 is a flowchart of an encoding method according to an embodiment of the present invention.

FIG. 6 shows a flowchart of an encoding method applied to a video system according to an embodiment of the present invention. In step S61, an intra-prediction process is performed on an image block included in a video frame according to a plurality of sets of reference image data to generate a residual block. The plurality of sets of reference image data includes a set of reference image data corresponding to a predetermined side of the image block. In step S62, a preliminary transform process is performed on the residual block to generate a preliminary transform coefficient matrix. In step S63, according to whether at least one of the set of reference image data corresponding to the predetermined side is generated according to image data of at least one adjacent pixel of the image block, it is determined whether a secondary transform process perpendicular to the predetermined side is to be performed on a low-frequency component sub-matrix in the preliminary transform coefficient matrix.

One person skilled in the art can understand that, step S63 may be performed before step S61 or step S62 without affecting overall effects of the encoding method. Further, operation variations given in the description associated with the encoding apparatus 400 are applicable to the encoding method in FIG. 6, and shall be omitted herein.

Figure 7A:
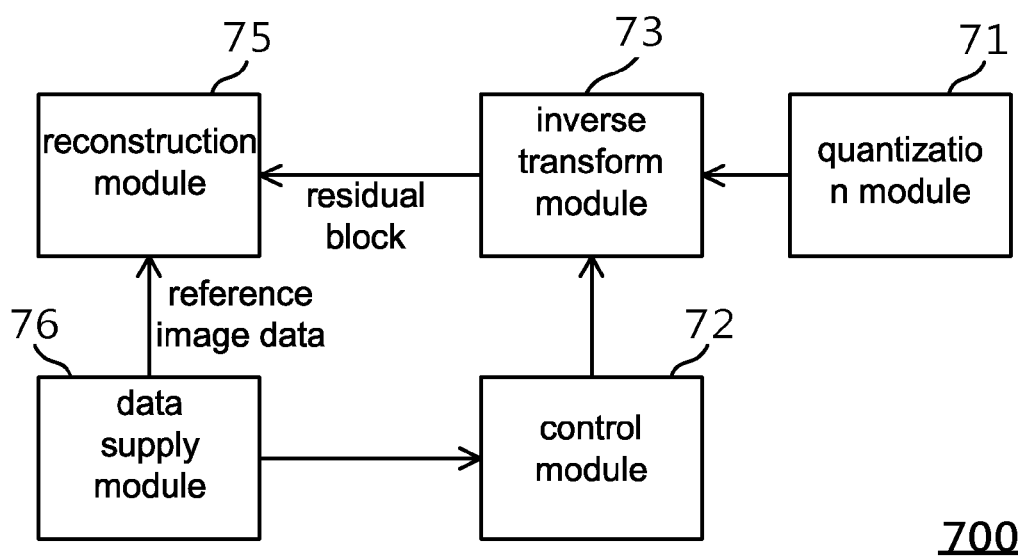
FIG. 7(A) and FIG. 7(B) are functional block diagrams of a decoding apparatus according to an embodiment of the present invention.
Figure 7B:
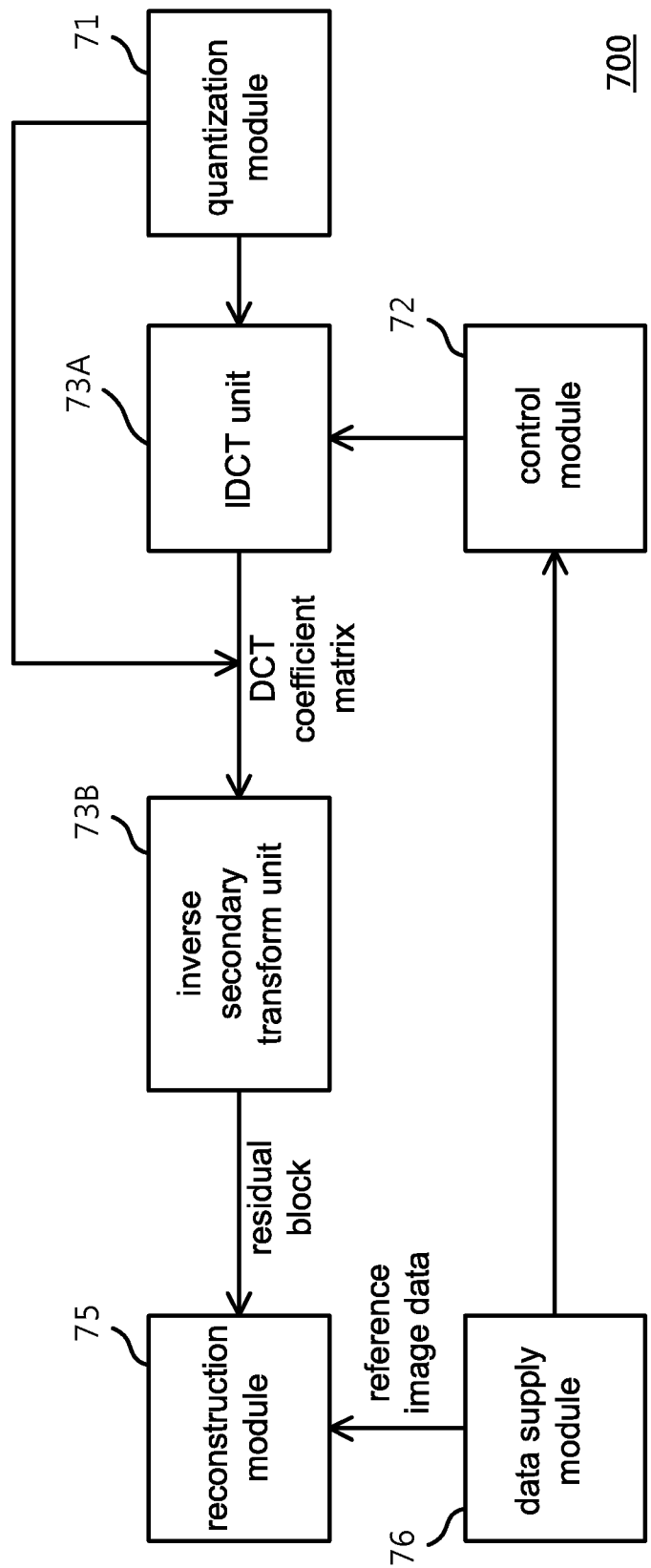

FIG. 7(A) shows a functional block diagram of a decoding apparatus applied to a video system according to another embodiment of the present invention. A decoding apparatus 700 includes an inverse quantization module 71, a control module 72, an inverse transform module 73, a reconstruction module 75, and a data supply module 76. Operations of the decoding apparatus 700 correspond to those of the encoding apparatus 400 and are in a substantially reverse order. In one embodiment, the inverse transform module 73 includes an inverse secondary transform unit 73A and an inverse discrete cosine transform (IDCT) unit 73B configured to perform an inverse secondary transform process and an IDCT process, respectively. One person skilled in the art can understand that, the inverse secondary transform unit 73A and the IDCT unit 73B may be implemented by one single multiplication circuit, and perform the inverse secondary transform process and the IDCT process in a time division manner.

The inverse quantization module 71 performs an inverse quantization process on an input signal (usually a decoded bit string). A corresponding output signal may be regarded as including two parts—a high-frequency component in a DCT coefficient matrix of an image block, and a low-frequency component in the DCT coefficient matrix (may have undergone secondary transform at an encoder end). The high-frequency component is directly provided to the IDCT unit 73B, and the low-frequency component is directly provided to the inverse secondary transform unit 73A. The inverse secondary transform unit 73A is controlled by the control module 72, and selectively performs an inverse secondary transform process on the low-frequency component signal to generate a low-frequency component sub-matrix.

According to whether at least one of a set of first reference image data is generated according to image data of an adjacent of an image block, the control module 72 determines whether inverse secondary transform along a first direction is to be performed on the low-frequency component signal of the image block. The first reference image data corresponds to a first side of the image block, and the first direction is perpendicular to the first side. In one embodiment, the decoding apparatus 700 operates in coordination with an AVS video system. When it is determined whether inverse secondary transform along the vertical direction is to be performed on the low-frequency component signal of an image block, the control module 72 selects a set of reference image data corresponding to an upper edge of the image block, and determines whether the reference image data is actual image data or predetermined filler data. When at least one of the set of first reference image data is actual image data, the control module 72 determines that inverse secondary transform unit 73A is to perform inverse secondary transform along the vertical direction on the low-frequency component signal of the image block. Similarly, when it is determined whether inverse secondary transform along the horizontal direction is to be performed on the low-frequency component signal of an image block, the control module 72 selects one set of reference image data corresponding to the left of the image block, and determines whether the reference image data is actual image data or predetermined filler data. When the set of first reference image data is actual image data, the control module 72 determines that inverse secondary transform unit 73A is to perform inverse secondary transform along the horizontal direction on the low-frequency component signal of the image block.

In practice, when the image block is located in a border region of a video frame or a video slice, at least a part of the reference image data is usually predetermined filler data. Thus, the control module 72 may determine whether reference image data is actual image data or predetermined filler data according to the location of an image block and the rule of predetermined filler data selected by the video specification of the image block. When an image block is located at the upper left corner of a video frame, it is possible that the reference image data at both the top and left be predetermined data. In the above situation, the inverse secondary transform module 73 does not perform any inverse secondary transform on the low-frequency component signal of the image block.

It should be noted that, when a secondary transform module at an encoder end is designed to first perform secondary transform along the horizontal direction and then perform secondary transform along the vertical direction on an input signal, the inverse secondary transform unit 73A in the decoding apparatus 700 is correspondingly designed to first perform inverse secondary transform along the vertical direction and then perform inverse secondary transform along the horizontal direction, and vice versa.

After receiving high-frequency DCT coefficients provided by the inverse quantization module 71 and low-frequency DCT coefficients outputted from the inverse secondary transform unit 73A, the IDCT unit 73B performs an IDCT process on a DCT coefficient matrix including these coefficients to generate a residual block. Next, the reconstruction module 73 reconstructs the image block according to the residual block and a plurality of sets of reference image data provided by the data supply module 76.

The determination logic of the control module 72 is associated with the determination logic of the control module 43 at the encoder end. If the control module 43 determines whether corresponding secondary conversion is to be performed only on the basis of whether reference image data is actual image data or predetermined filler data, the control module 72 also only considers whether the reference image data is actual image data or predetermined filler data. If the control module 43 further determines the type of reference mode corresponding to the final residual block outputted from the intra-prediction module 42, the control module 72 also further considers the reference mode corresponding to the residual block. For example, the determination logic of the control module 72 may be that, only when the residual block of an image block is directly associated with reference image data at an upper edge of the image block, the control module 72 further considers whether the reference data corresponding to the upper edge of the image block is actual image data. Only when the residual block of an image block is directly associated with the reference image data corresponding to the upper edge of the image block and the reference image block corresponding to the upper edge of the image block is actual image data, the control module 72 then causes the inverse secondary transform unit 73A to perform inverse secondary conversion along the vertical direction.

Figure 8:
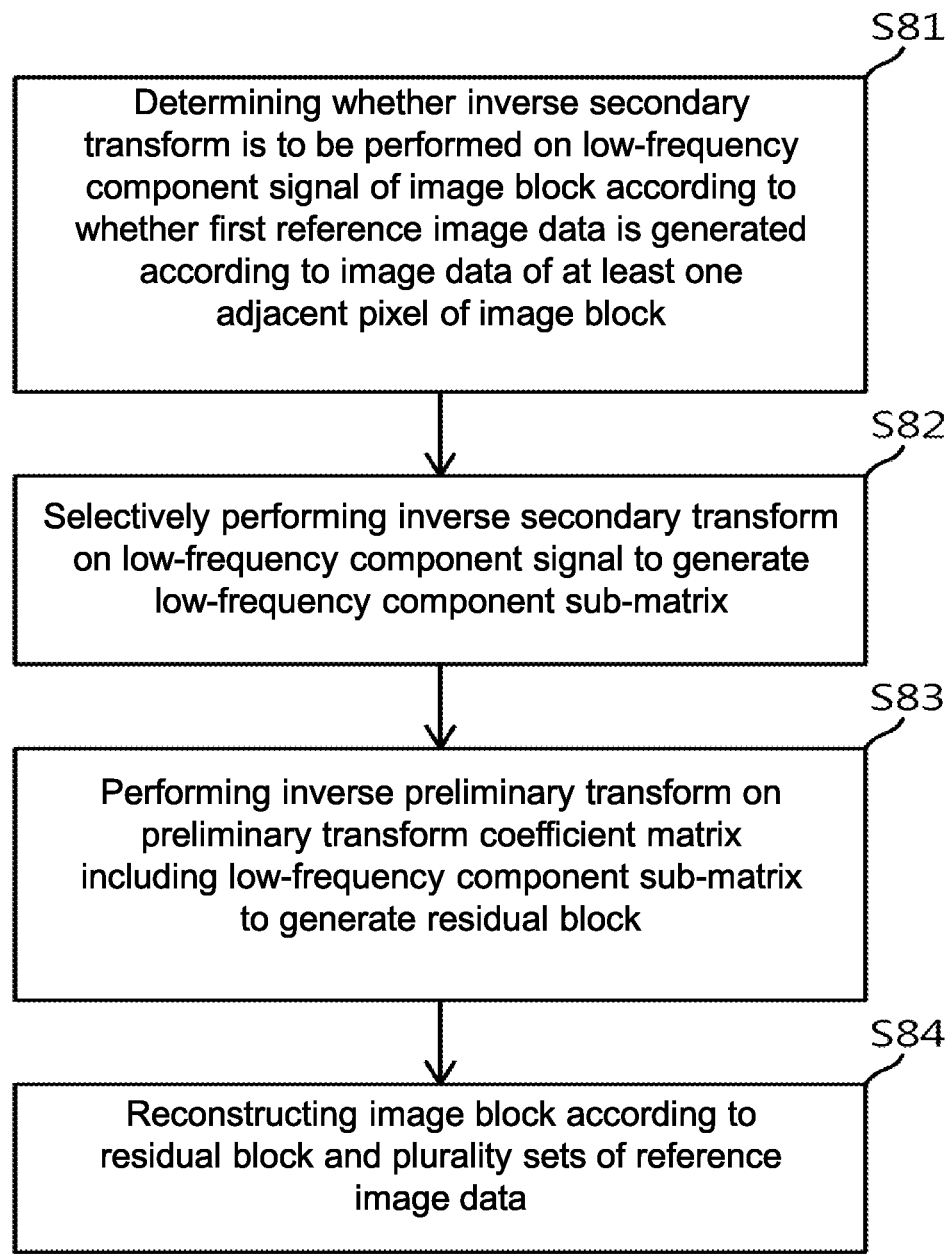
FIG. 8 is a flowchart of a decoding method according to an embodiment of the present invention.

FIG. 8 shows a flowchart of a decoding method applied to a video system according to another embodiment of the present invention. In step S81, according to whether at least one of a set of reference image data is generated according to image data of at least one adjacent pixel of an image block, it is determined whether inverse secondary transform is to be performed on a low-frequency component signal of the image block. The set of reference image data corresponds to a predetermined side of the image block, and a direction of the inverse secondary transform is perpendicular to the predetermined side. In step S82, according to the determination result of step S81, an inverse secondary transform process is selectively performed on the low-frequency component signal to generate a low-frequency component sub-matrix. In step S83, an inverse preliminary transform process is performed on a preliminary transform coefficient matrix including the low-frequency component sub-matrix to generate a residual block. In step S84, the image block is reconstructed according to the residual block and a plurality of sets of reference image data.

One person skilled in the art can understand that, various operation details in the description associated with the decoding apparatus 700 are applicable to the decoding method in FIG. 8, and shall be omitted herein.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A video encoding apparatus applied to a video system, comprising:

an intra-prediction module, configured to perform intra-prediction on an image block in a video frame according to a plurality sets of reference image data to generate a corresponding residual block, the image block having a first side, the plurality of sets of reference image data including a set of first reference image data corresponding to the first side;

a transform module, configured to perform preliminary transform on the residual block to generate a preliminary transform coefficient matrix; and a control module, configured to determine whether secondary transform is to be performed along a first direction, perpendicular to the first side, on a low-frequency component sub-matrix in the preliminary transform coefficient matrix according to whether at least one of the set of first reference image data is generated according to image data of at least one adjacent pixel of the image block, as opposed to predetermined filler data, wherein the secondary transform is selectively performed regardless of a reference mode that the residual block uses;

wherein, the transform module selectively performs the secondary transform along the first direction on the low-frequency component sub-matrix according to a determination result of the control module.

2. The encoding apparatus according to claim 1, wherein when the control module determines that the at least one of the set of first reference image data is generated according to the image data of at least one adjacent pixel of the image block, the control module determines that the secondary transform is to be performed on the low-frequency component sub-matrix along the first direction; when the control module determines that the at least one of the set of first reference image data is not generated according to the image data of at least one adjacent pixel of the image block, the control module determines that the secondary transform is not to be performed on the low-frequency component sub-matrix along the first direction.

3. The encoding apparatus according to claim 2, wherein when the residual block is directly associated with the set of first reference image data and the at least one of the set of first reference image data is generated according to the image data of at least one adjacent pixel of the image block, the control module determines that the secondary transform is to be performed on the low-frequency component sub-matrix along the first direction; when the residual block is not directly associated with the set of first reference image data or the at least one of the set of first reference image data is not generated according to the image data of at least one adjacent pixel of the image block, the control module determines that the secondary transform is not to be performed on the low-frequency component sub-matrix along the first direction.

4. The encoding apparatus according to claim 1, wherein the plurality of sets of reference image data includes a set of second reference image data corresponding to a second side of the image block, and the second side is different from the first side; the control module further determines whether the secondary transform along a second direction, perpendicular to the second side, is to be performed on the low-frequency component sub-matrix according to whether at least one of the set of second reference image data is generated according to the image data of at least one adjacent pixel of the image block.

5. The encoding apparatus according to claim 4, wherein when the at least one of the set of second reference image data is generated according to the image data of at least one adjacent pixel of the image block, the control module determines that the secondary transform is to be performed on the low-frequency component sub-matrix along the second direction; when the at least one of the set of second reference image data is not generated according to the image data of at least one adjacent pixel of the image block, the control module determines that the secondary transform is not to be performed on the low-frequency component sub-matrix along the second direction.

6. The encoding apparatus according to claim 4, wherein when the residual block is directly associated with the set of second reference image data and the at least one of the set of second reference image data is generated according to the image data of at least one adjacent pixel of the image block, the control module determines that the secondary transform is to be performed on the low-frequency component sub-matrix along the second direction; when the residual block is not directly associated with the set of second reference image data or the at least one of the set of second reference image data is not generated according to the image data of at least one adjacent pixel of the image block, the control module determines that the secondary transform is not to be performed on the low-frequency component sub-matrix along the second direction.

7. A video decoding apparatus applied to a video system, comprising:
a control module, configured to determine whether inverse secondary transform along a first direction, perpendicular to a first side, is to be performed on a low-frequency component signal of an image block according to whether at least one of a set of first reference image data is generated according to image data of at least one adjacent pixel of the image block, the set of first reference image data corresponding to the first side of the image block;
an inverse transform module, configured to selectively perform inverse secondary transform on the low-frequency component signal according to a determination result of the control module to generate a low-frequency component sub-matrix, and to perform inverse preliminary transform on a preliminary transform coefficient matrix including the low-frequency component sub-matrix to generate a residual block, as opposed to predetermined filler data, wherein the inverse secondary transform is selectively performed regardless of a reference mode that the residual block uses; and
a reconstruction module, configured to reconstruct the image block according to the residual block and a plurality of sets of reference image data.

8. The decoding apparatus according to claim 7, wherein when the at least one of the set of first reference image data is generated according to image data of at least one adjacent pixel of the image block, the control module determines that the inverse secondary transform is to be performed on the low-frequency component signal along the first direction; when the least one of the set of first reference image data is not generated according to the image data of at least one adjacent pixel of the image block, the control module determines that the inverse secondary transform is not to be performed on the low-frequency component signal along the first direction.

9. The decoding apparatus according to claim 7, wherein when the residual block is directly associated with the set of first reference image data and the at least one of the set of first reference image data is generated according to the image data of at least one adjacent pixel of the image block, the control module determines that the inverse secondary transform is to be performed on the low-frequency component signal along the first direction; when the residual block is not directly associated with the set of first reference image data or the at least one of the set of first reference image data is not generated according to the image data of at least one adjacent pixel of the image block, the control module determines that the inverse secondary transform is not to be performed on the low-frequency component signal along the first direction.

10. The decoding apparatus according to claim 7, wherein the plurality of sets of reference image data includes a set of second reference image data, corresponding a second side of the image block, and the second side is different from the first side; the control module further determines whether the inverse secondary transform along a second direction, perpendicular to the second side, is to be performed on the low-frequency component signal according to whether at least one of the set of second reference image data is generated according to the image data of at least one adjacent pixel of the image block.

11. The decoding apparatus according to claim 10 wherein when the at least one of the set of second reference image data is generated according to the image data of at least one adjacent pixel of the image block, the control module determines that the secondary transform is to be performed on the low-frequency component signal along the second direction; when the set of second reference image data is not generated according to the image data of at least one adjacent pixel of the image block, the control module determines that the inverse secondary transform is not to be performed on the low-frequency component signal along the second direction.

12. The decoding apparatus according to claim 10, wherein when the residual block is directly associated with the set of second reference image data and the at least one of the set of second reference image data is generated according to the image data of at least one adjacent pixel of the image block, the control module determines that the inverse secondary transform is to be performed on the low-frequency component signal along the second direction; when the residual block is not directly associated with the set of second reference image data or the at least one of the set of second reference image data is not generated according to the image data of at least one adjacent pixel of the image block, the control module determines that the inverse secondary transform is not to be performed on the low-frequency component signal along the second direction.

13. A video decoding method applied to a video system, comprising:
    a) determining whether inverse secondary transform along a first direction, perpendicular to a first side, is to be performed on a low-frequency component signal of an image block according to whether at least one of a set of first reference image data is generated according to image data of at least one adjacent pixel of the image block, as opposed to predetermined filler data, the set of first reference image data corresponding to the first side of the image block;
    b) selectively performing inverse secondary transform on the low-frequency component signal according to a determination result of step (a) to generate a low-frequency component sub-matrix;
    c) performing inverse preliminary transform on a preliminary transform coefficient matrix including the low-frequency component sub-matrix to generate a residual block; and
    d) reconstructing the image block according to the residual block and a plurality of sets of reference image data,
    wherein the inverse secondary transform is selectively performed regardless of a reference mode that the residual block uses.

14. The decoding method according to claim 13, wherein step (a) comprises:
    when the at least one of the set of first reference image data is generated according to the image data of at least one adjacent pixel of the image block, determining that the inverse secondary transform is to be performed on the low-frequency component signal along the first direction; and
    when the at least one of the set of first reference image data is not generated according to the image data of at least one adjacent pixel of the image block, determining that the inverse secondary transform is not to be performed on the low-frequency component signal along the first direction.

15. The decoding method according to claim 13, wherein step (a) comprises:
    when the residual block is directly associated with the set of first reference image data and the at least one of the set of first reference image data is generated according to the image data of at least one adjacent pixel of the image block, determining that the inverse secondary transform is to be performed on the low-frequency component signal along the first direction; and
    when the residual block is not directly associated with the set of first reference image data or the at least one of the set of first reference image data is not generated according to the image data of at least one adjacent pixel of the image block, determining that the inverse secondary transform is not to be performed on the low-frequency component signal along the first direction.

16. The decoding method according to claim 13, wherein the plurality of sets of reference image data includes a set of second reference image data, the set of second reference image data corresponds a second side of the image block, and the second side is different from the first side; before step (b), the decoding method further comprising:
    e) determining whether the inverse secondary transform along a second direction, perpendicular to the second side, is to be performed on the low-frequency component signal according to whether at least one of the set of second reference image data is generated according to the image data of at least one adjacent pixel of the image block.

17. The decoding method according to claim 16, wherein step (e) comprises:
    when the at least one of the set of second reference image data is generated according to the image data of at least one adjacent pixel of the image block, determining that the secondary transform is to be performed on the low-frequency component signal along the second direction; and
    when the set of second reference image data is not generated according to the image data of at least one adjacent pixel of the image block, determining that the inverse secondary transform is not to be performed on the low-frequency component signal along the second direction.

18. The decoding method according to claim 16, wherein step (e) comprises:
    when the residual block is directly associated with the set of second reference image data and the at least one of the set of second reference image data is generated according to the image data of at least one adjacent pixel of the image block, determining that the inverse secondary transform is to be performed on the low-frequency component signal along the second direction; and
    when the residual block is not directly associated with the set of second reference image data or the at least one of the set of second reference image data is not generated according to the image data of at least one adjacent pixel of the image block, determining that the inverse secondary transform is not to be performed on the low-frequency component signal along the second direction.

19. The decoding method according to claim 13, wherein when the first side is an upper edge of the image block, the secondary transform along the first direction is secondary transform along a vertical direction; when the first side is a left edge of the image block, the secondary transform along the first direction is secondary transform along a horizontal direction.

\* \* \* \* \*